United States Patent [19]

Tsukamoto et al.

[11] Patent Number: 4,535,261

[45] Date of Patent: Aug. 13, 1985

[54] SMALLSIZE MOTOR WITH REDUCTION GEAR AND CLUTCH MECHANISM

[75] Inventors: Kou Tsukamoto; Masatoshi Hirate, both of Kasugai, Japan

[73] Assignee: CKD Controls Limited, Kasugai, Japan

[21] Appl. No.: 474,587

[22] PCT Filed: Jun. 1, 1982

[86] PCT No.: PCT/JP82/00214

§ 371 Date: Feb. 3, 1983

§ 102(e) Date: Feb. 3, 1983

[30] Foreign Application Priority Data

Jun. 3, 1981 [JP] Japan ................................. 56-85200
Aug. 13, 1981 [JP] Japan ............................... 56-127096

[51] Int. Cl.³ ............................................. H02K 7/10
[52] U.S. Cl. ..................................... 310/78; 310/209; 310/83
[58] Field of Search ....................... 310/77, 78, 92, 94, 310/191, 209, 83

[56] References Cited

U.S. PATENT DOCUMENTS

| 1,794,618 | 3/1931 | Howe | 310/78 |
| 2,685,043 | 7/1954 | Durant | 310/78 X |
| 3,582,697 | 6/1971 | Bochan et al. | 310/78 |
| 3,599,022 | 8/1971 | Adair | 310/78 X |
| 4,391,356 | 7/1983 | Takemura et al. | 310/78 X |

FOREIGN PATENT DOCUMENTS

| 2646895 | 4/1978 | Fed. Rep. of Germany . |
| 48-38735 | 11/1973 | Japan . |
| 0056-444 | 4/1980 | Japan ................................. 310/78 |

Primary Examiner—Mark O. Budd
Attorney, Agent, or Firm—Armstrong, Nikaido, Marmelstein & Kubovcik

[57] ABSTRACT

This invention employs the structure that the clutch mechanism is provided between the rotating shaft (4) of a smallsize motor itself and the reduction mechanism (21) and said clutch mechanism is coupled or decoupled by a magnetic force generated by the excitation coil (2) of the motor and the spring means (19) giving a force in the direction opposing to said magnetic force.

1 Claim, 9 Drawing Figures 4,535,261

SMALLSIZE MOTOR WITH REDUCTION GEAR AND CLUTCH MECHANISM

FIELD OF THE INVENTION

This invention relates to a miniature motor providing the reduction mechanism, where a miniature motor itself provides the clutch mechanism. Thereby, when the motor starts to operate by receiving a power supply, the rotating shaft of motor and the reduction mechanism are coupled via the clutch mechanism, while the supply of power stops, the clutch mechanism is isolated, decoupling between the rotating shaft of motor and reduction mechanism.

BACKGROUND OF THE INVENTION

An existing smallsize motor with reduction mechanism is described, for example, in the examined Japanese utility model application 50-9044. As shown in FIG. 9, the rotating shaft A of a motor is always coupled to the output shaft C via the reduction mechanism B. When a power is supplied to the excitation coil D, a rotating force of rotor E is transmitted to the output shaft C through the reduction mechanism B, thus driving a load. However, in the case of an existing motor, the rotating shaft A is always connected to the reduction mechanism B, and even when supply of power to the motor stops in order to release the load, the rotor E is rotated reversely only with a force of load because the rotor E of motor is coupled to the load, making it difficult to momentarily return the load to the original position. The load can be released momentarily, by providing the clutch mechanism between the motor and load and by connecting it when the motor rotates or by isolating it when the motor stops. But a particular drive source is required for coupling and isolation of clutch, resulting in cost-up. In addition, control of clutch is difficult because it must be connected or isolated by such a drive source accurately in accordance with start and stop of motor rotation.

DISCLOSURE OF THE INVENTION

This invention discloses in order to solve such problem that the clutch mechanism is isolated upon stoppage of power supply to the motor and thereby the rotating shaft of motor is disconnected from the reduction mechanism, and has such an object that this clutch mechanism is accurately driven in accordance with ON and OFF of the excitation coil of motor without using any particular driving source.

In order to attain this object, the present invention discloses the following configuration as the basic structure that the through hole allowing insertion of the rotating shaft is provided, the one end of iron core providing the excitation coil at the periphery is inserted into the central hole of the main pole and interpole, a high magnetic resistance material is provided between said main pole, interpole and iron core, moreover the absorbing disk is provided at the one end of the rotating shaft opposing to the one end of said iron core, main pole and interpole, and said rotating shaft is supported with freedom of shifting in the axial direction. At the other end of said rotating shaft, the clutch mechanism is provided. Said clutch mechanism is provided for the reduction mechanism so that the clutch is coupled when the iron core is magnetized by the excitation coil and said absorbing disk is attracted toward the iron core, thereby the rotating shaft shifts in the axial direction. Moreover, a spring means which gives a spring force in reverse direction to a magnetic attracting force to the rotating shaft is provided so that the clutch mechanism is decoupled when said excitation coil is placed into non-excited condition. In such a structure, when a power is supplied to the excitation coil and the motor starts to rotate, the absorbing disk is attracted to the iron core by a magnetic force generated by said excitation coil and at this time the rotating shaft moves in the axial direction and the clutch mechanism provided between the reduction mechanism and the shaft is coupled. On the other hand, an output of the motor is transmitted to a load via this clutch mechanism and reduction mechanism. Moreover, since the iron core is put into the non-excited condition and a magnetic absorbing force disappears, simultaneously when supply of the power to the excitation coil stops, the absorbing disk and the rotating shaft are released from the iron core and is returned to the original position by a spring means, decoupling the clutch mechanism from the reduction mechanism.

According to the present invention, as explained above, when supply of power to the excitation coil becomes OFF, the rotor side, namely the rotating shaft is disconnected from the reduction mechanism and the motor is isolated from a load. Therefore, a load can be returned immediately to the initial condition. In addition, the absorbing disk is coupled or decoupled by making use of the magnetic flux generated by the excitation coil, power ON-OFF to the excitation coil and start-release of load are accurately synchronized, a particular driving source is not required for driving the clutch mechanism. Therefore the structure is simplified ruling out the cost-up. Particularly, a magnetically high resistance is provided between the iron core, main pole and interpole, and a magnetic loop is formed between the iron core, main pole and interpole via the absorbing disk consisting of the magnetic material. Thereby, the magnetic flux between the iron core, main pole and interpole can be used effectively for attracting the absorbing disk and a sufficient clutch diriving force can be obtained.

PREFERRED EMBODIMENT OF THE INVENTION

Figure 1:
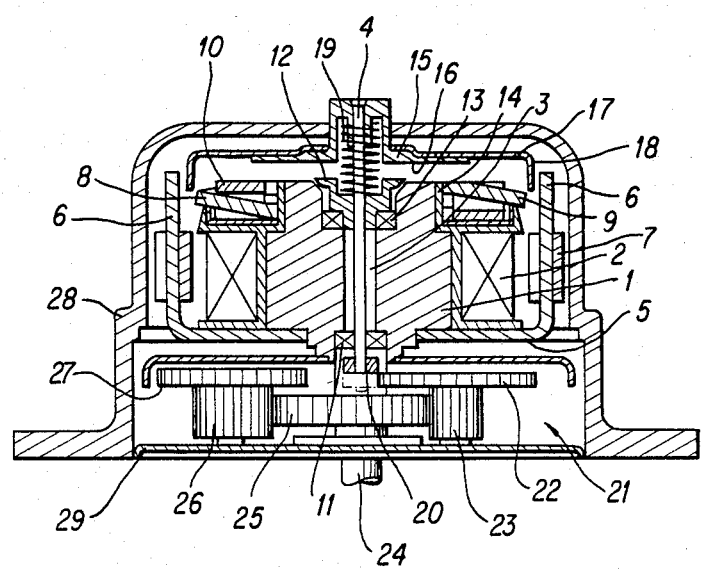
FIG. 1 is the vertical sectional view indicating an embodiment of a miniature motor with the reduction mechanism of the present invention.
Figure 2:
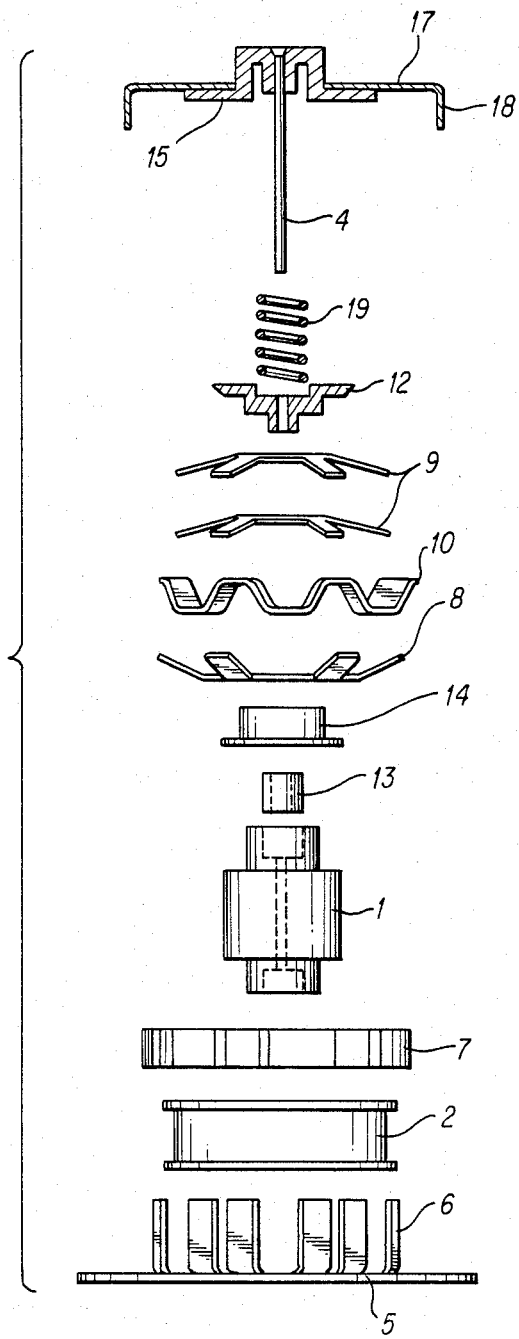
FIG. 2 is the disassembling view of motor.
Figure 3:
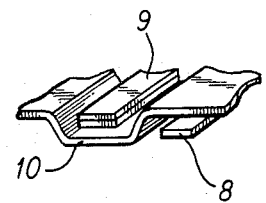
FIG. 3 is the perspective view of the principal portion of FIG. 1.
Figure 4:
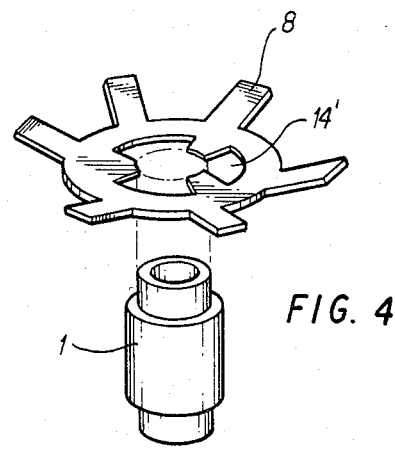
FIG. 4 is the perspective view of the principal portion of another embodiment of the iron core, main pole and interpole loading portion.

The preferred embodiment of the miniature motor with reduction mechanism of the present invention is explained hereunder. FIG. 1 is the vertical sectional view of a miniature motor with reduction mechanism. FIG. 2 is the disassembling view of a motor. FIG. 3 is the perspective view of the principal portion of FIG. 1. In the figures, 1 is the iron core allowing the excitation coil 2 to be wound its outside. The iron core 1 is formed as the thick cylindrical core, allowing the rotating shaft 4 of motor to be inserted into its cylindricalhole 3. The one end (lower end) of the iron core 1 is fixed at the center of the yoke 5 consisting of a magnetic plate and is provided with plurality of pole pieces 6 which are bending toward circumference of the excitation coil 2 from this yoke 5. The shading ring 7 is mounted between these pole pieces 6. At the other end (upper end) of iron core 1, the main pole 8 and interpole 9 providing plurality of poles in the radial direction and the shading ring 10 are provided and fixed. Namely, the ring-shaped high magnetic resistance material 14 is provided within the center hole of the main pole 8 and interpole 9, and the upper end of the iron core is inserted into said high magnetic resistance material. As such a magnetic high resistance material 14, a ring-shaped material consisting of non-magnetic material as shown in FIG. 1 is provided in the non-contact condition between the main pole 8, interpole 9 and iron core 1. Thereby, a reliable magnetic high resistance can be obtained. A sufficient effect can also be obtained even if it is not provided in the perfect non-contact condition. Namely, an air gap 14' is provided between the main pole 8, interpole 9 and iron core 1 as shown in FIG. 4 and the tongues are partially projected from the main pole 8, interpole 9 in contact with such a ring-shaped resistance material in view of supporting it.

Explained above is the structure in the stator side and that of rotor side for rotating the shaft 4 is explained below. Namely, the one end (lower end) of the rotating shaft 4 is supported by the iron core 1 via the bearing 11, while the other end (upper end) is supported by the upper end of iron core 1 via the spring support 12 and bearing 13. The cylindrical portion of the spring support 12 is supported by the bearing 13 with freedom of rotation but no sliding in the axial direction, allowing insertion of the rotating shaft 4 into said cylindrical portion. The absorbing disk 15 consisting of a magnetic material is fixed to the upper portion of the rotating shaft 4 than the spring support 12. This absorbing disk 15 provides the disk-shaped absorbing surface 16, placed opposing to the end of iron core 1, main pole 8, interpole 9 and shading ring 10. At the circumferential edge of the non-magnetic hysteresis ring holding plate 17 being fixed to the outside of said absorbing disk 15, the hysteresis ring 18 is settled. The hysteresis ring 18 is composed of a material showing excellent hysteresis characteristic and is opposing to said pole pieces 6 keeping a gap. Thereby, the hysteresis ring 18 can reciprocally move in the axial direction while keeping a constant gap opposing to the pole pieces 6.

The return spring 19 consisting of the coil spring exists between the absorbing disk 15 and the spring support 12, and this spring is pushing upward the absorbing disk 15 and hysteresis ring 18, thereby isolating said absorbing disk 15 from the iron core 1, main pole 8, interpole 9 and the spring support 12. At the outside of the bearing 11 at the lower end of rotating shaft 4, the gear 20 is fixed and when this gear 20 comes to contact with the bearing 11, the position of the ascending direction of the rotating shaft 4 and absorbing disk 15 is restricted.

The absorbing disk 15 is composed of a magnetic material. When the magnetic flux is generated at the iron core 1 because the power source is supplied to the excitation coil 2, this magnetic flux passes the closed loop of iron core 1 - absorbing disk 15 - main pole 8 and interpole 9 - hysteresis ring 18 - pole piece 6 - yoke 5 - iron core 1. Thereby, the absorbing disk 15 is magnetically attracted toward the iron core 1 and main pole 8, interpole 9, moving downward the rotating shaft 4 and hysteresis ring 18 and causing them to come to contact with the spring support 12. At this time, a rotating force is generated at the hysteresis ring 18 by the magnetic flux passing the hysteresis ring 18 and pole pieces 6 and rotation of rotating shaft 4 causes the gear to rotate 20. In case the rotating spring support 12 is composed of a magnetic material, the magnetic flux generated when the power source is supplied to the excitation coil 2 magnetizes said spring support 12 through the loop passing the iron core 1 - bearing 13 - spring support 12 -absorbing disk 15 - main pole, interpole 9 which is different from said closed loop. When the power source is supplied to the excitation coil 2, the absorbing disk 15 is thus attracted also to the spring support 12. When the absorbing disk 15 is attracted, it rotates together with the spring support 12 as an integrated body but the absorbing disk 15 is isolated from the edge of iron core 1 by a narrow gap.

When power supply to the excitation coil stops, a rotating force of the hysteresis ring 18 disappears and the rotating shaft 4 stops rotation also after it rotates for a while by the inertia force. In this case, moreover, the magnetic attracting force between the iron core 1 and absorbing disk 15 and between the main pole 8, interpole 9 and the absorbing disk 15 also disappears and thereby the rotating shaft 4 and absorbing disk 15 is pushed upward by the return spring 19 and consequently the gear 20 also moves upward. Namely, when power source is supplied to the excitation coil 2, the rotating shaft 4 moves downward causing the gear 20 to move downward to the position indicated by the broken line. When power supply to the excitation coil 2 stops, the gear 20 is pushed upward to the position indicated by the solid line by the rotating shaft 4. The spring support 12 which supports with freedom of rotation the upper end of the rotating shaft 4 and also supports the absorbing disk 15 is only an example and may employ the other structure. Only the magnetic flux passing the end of iron core 1 can sufficiently attract the absorbing disk 15 and drive the hysteresis ring 18, without forming the magnetic path using the spring support 12.

The clutch for the reduction mechanism can be coupled or decoupled by the upward or downward movement of this gear 20. 21 is the reduction mechanism consisting of the gears providing gear pinions in large and small diameters. 22 is the first gear providing the gear pinion in the first stage. 24 is the output shaft provided at the output gear in large diameter. This output gear 25 engages with the gear pinion in the preceding stage, allowing the required number of reduction gears not illustrated to exist between the gear 27 in a large diameter and said gear pinion 23.

Said motor is comprised in the casing 28 and is fixed to the casing 28 through the yoke 5. The reduction mechanism 21 is comprised at the aperture of casing 28 and the output shaft 24 is projected from the bottom plate 29 of aperture edge. The gear 20 of the rotating shaft 4 and the first gear 22 of the reduction mechanism 21 do not engage each other when the gear 20 is ascending but engage when it is descending to the position indicated by the broken line. Therefore, when power source is supplied to the excitation coil 2 and the motor starts to rotate, the rotating force of rotating shaft 4 is transmitted to the reduction mechanism causing the rotating shaft 24 to rotate but when power supply to the excitation coil 2 stops, said absorbing disk 15 immediately isolates from the iron core 1 and the gear 20 moves upward decoupling from the gear 200. Thus, the reduction mechanism no longer rotates and the output shaft 24 also does not rotate. As a result, upon suspension of power supply to the motor, a driving force transmitted from the output shaft 24 is also suspended.

Figure 5:
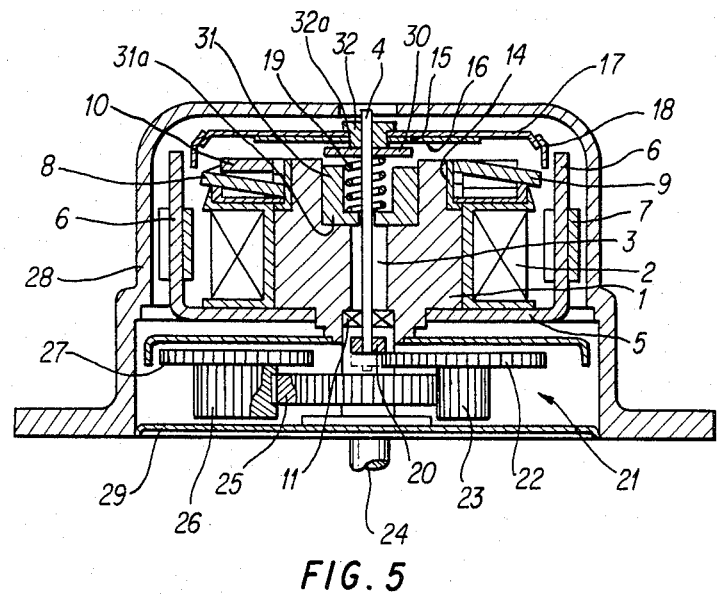
FIG. 5 is the vertical sectional view indicating other embodiment of the present invention.

FIG. 5 is the vertical sectional view of another embodiment of the present invention. The iron core 1 provides the excitation coil 2 wound at its outside and is designed as a thick cylindrical body allowing insertion of the rotating shaft 4 of motor into its cylindrical hole 3. Moreover, it is supported with freedom of moving in the axial direction. As in the case of the first embodiment, this embodiment is so configured that when the power source is supplied to the excitation coil 2, the closed loop of magnetic flux is generated passing the iron core 1 - aborbing disk 15 - main pole, interpole - hysteresis ring 18 - magnetic pole piece 6 - yoke 5 - iron core 1, and the rotating shaft 4 moves downward causing the gear 20 to engage with the gear 22 and the hysteresis ring 18 to rotate. In this embodiment, other spring support member is provided in order to support the rotating shaft in the thrust direction in place of the spring support 12 and bearing 13 shown in FIG. 3 so that it operates as the bearing.

Namely, the one end (lower end) of the rotating shaft 4 is supported by the iron core 1 via the bearing 11, while the other end (upper end) is supported by the upper end of iron core 1 via the washer 30 of the magnetic material which is used as the spring support member and the bearing 31 of magnetic material. The bearing 31 is almost cylindrical and pressed into the iron core 1 and fixed. The hollow portion of said bearing 31 comprises the return spring 19 consisting of the coil spring in such a manner as surrounding the rotating shaft 4 and the one end of said return spring is supported by the spring support 13a provided at the bottom portion of bearing 31. The rotating shaft 4 is supported in the axial direction by the axial hole of spring supporting member 31a. The washer 30 is placed above the bearing 31 and it is pressed by the return spring 19 in such a direction as is isolated from the bearing 31. The rotating shaft 4 is inserted into the bearing 31 and washer 30 and the sbsorbing disk 15 of the magnetic material is fixed at the end of said rotating shaft 4 above the washer 30. The absorbing surface 16 of this absorbing disk 15 is opposing to the end of iron core 1, washer 30, main pole 8, interpole 9 and shading ring 10. The hysteresis ring 18 is fixed to the circumference of the hysteresis ring holding plate 17 of the non-magnetic material being fixed at the outside of said absorbing disk 15.

On the other hand, the absorbing disk 15 is fixed to the rotating shaft 4 via the bush 32 and the washer 30 is being pressed by the return spring 19 to the projected portion 32a at the inside of said bush 32. For this reason, the washer 30, absorbing disk 15 and hysteresis ring 18 are pressed upward by this return spring 19 and the absorbing disk 15 is isolated from the iron core 1, main pole 8, interpole 9 and bearing 13. When the magnetic flux is generated at the iron core 1 due to the power source applied to the excitation coil 2, this magnetic flux passes the closed loop of iron core 1 - absorbing disk 15 - min pole 8 and interpole 9 - hysteresis ring 18 - pole pieces 6 - yoke 5 - iron core 1. In addition, the magnetic loop, iron core 1 - bearing 31 - washer 30 - absorbing disk 15 is formed in parallel with the magnetic loop, iron core 1 - absorbing disk. Therefore, the absorbing disk 15 is magnetically absorbed to the iron core 1, bearing 31, main pole 8, interpole 9 causing the rotating shaft 4 and hysteresis ring 18 to go downward and to be supported by the bearing 31 via the washer 30.

At this time, a rotating force is generated at the hysteresis ring 18 due to the magnetic flux of said closed loop passing the hysteresis ring 18 and rotation of the rotating shaft 4 causes the gear 20 to rotate. When the absorbing disk 15 is being attracted, the washer 30 stops due to a friction force generated by the bearing 31 and return spring 19, and the absorbing disk 15 rotates for the washer 30 under the condition that the absorbing disk 15 is being attracted to the washer 30 and is supported. At this time, the absorbing disk 15 and edge of iron core 1 are isolated as long as a narrow gap according to the thickness of washer 30.

When power source supply to the excitation coil stops, a rotating force of the hysteresis ring 18 disappears and the rotating shaft 4 also stops. Moreover, the magnetic attracting force between the iron core 1 and absorbing disk 15, between the washer 30 and absorbing disk 15, bearing 31, between main pole 8, interpole 9 and absorbing disk 15 also disappears. Thereby, the rotating shaft 4 and absorbing disk 15 are pushed upward by the return spring 19, causing the gear 20 to move upward. Namely, when power source is supplied to the excitation coil 2, the rotating shaft 4 moves downward causing the gear 20 to move downward up to the position indicated by the broken line. When power source supply to the excitation coil 2 stops, the gear 20 moved downward up to the position indicated by the solid line due to the rotating shaft 4. As in the case of the first embodiment, the clutch is coupled or decoupled to/from the reduction mechanism by the vertical movement of this gear 20.

When the power source is supplied to the excitation coil 2 and the motor rotates, the gear 20 moves downward and engages with the gear 22 as indicated by the broken line. Thereby, rotating force of rotating shaft 4 is transmitted to the reduction mechanism 21. When the power source supply to the excitation coil 2 stops, the absorbing disk 15 isolates from the iron core 1, the gear 20 moves upward releasing from the gear 22. Thereby the rotating force of output shaft 24 disappears.

Figure 6:
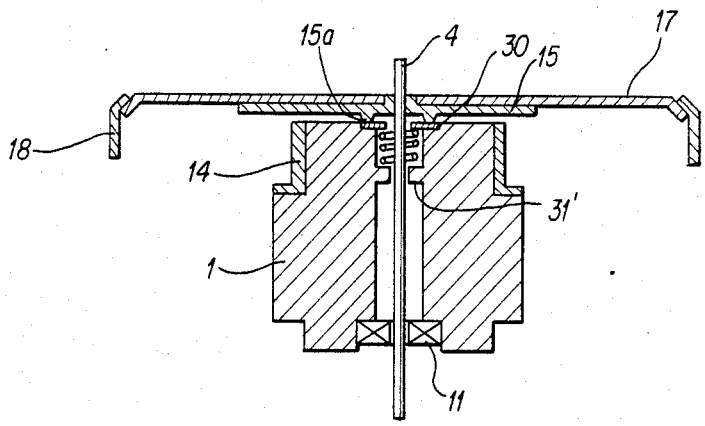
FIG. 6 is the sectional view of the principal portion indicating other embodiment of the shaft supporting portion.

It is also possible, as shown in FIG. 6, to form directly the bearing portion 31 to the iron core 1, in place of forming individually the bearing 31, independent of the iron core 1. Moreover, the absorbing disk 15 may be fixed directly to the rotating shaft 4 and the projected portion 15a may also be formed to the absorbing disk itself 15. Moreover, it is also possible to attract the absorbing disk only with an attracting force between the iron core 1 and the absorbing disk 15 by forming the washer 30 and bearing 31 of FIG. 5 with non-magnetic material.

POSSIBILITY OF APPLICATION INTO INDUSTRY

Figure 7:
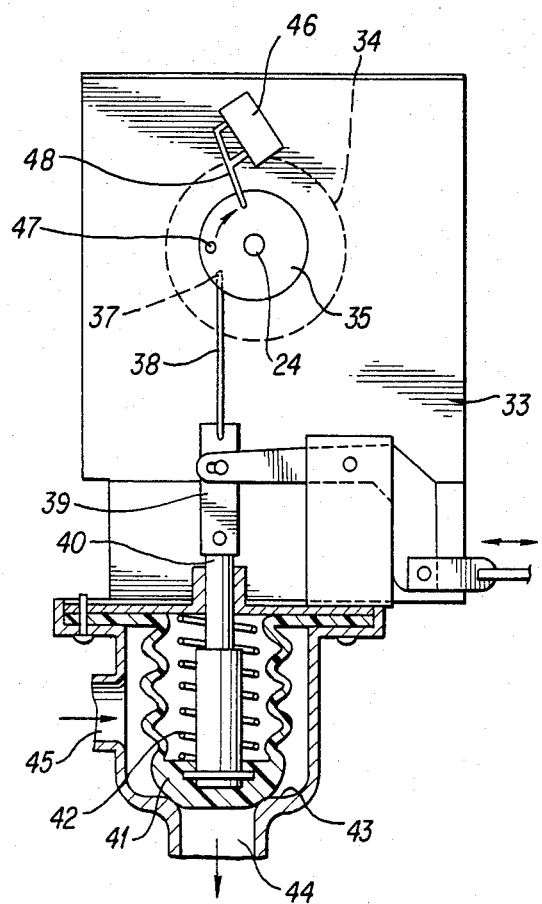
FIG. 7 is the front view of partial sectional view of the drain valve mounting a miniature motor of the present invention.

FIG. 7 is the front view of the section of a portion indicating an example where a miniature motor of the present invention is used for driving the drain valve of an electric washing machine.

Figure 8:
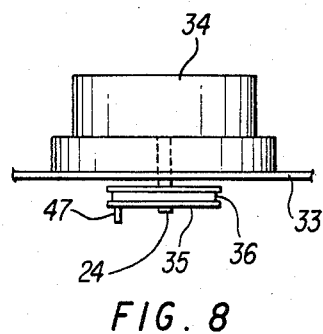
FIG. 8 is the plan view of the principal portion of the same drain valve.
Figure 9:
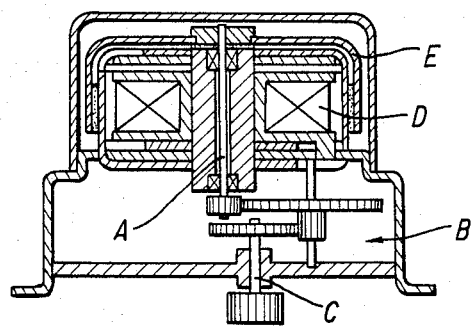
FIG. 9 is the vertical sectional view of an existing miniature motor with reduction mechanism.

FIG. 8 is the plan view of the principal portion. At the rear side of mounting base plate 33, the motor 34 of the present invention is mounted and its output shaft 24 is provided with take-up pulley 35 which resembles a pulley. Moreover, the wire 38 is settled to a point 37 of the groove 36 provided at the circumference of such take-up pulley 35. The other end of this wire 38 is connected to the valve shaft 40 via the coupling arm 39. The lower end of valve shaft 40 is buried in the rubber valve body 41 and the valve body 41 is pressed to the valve seat 40 by means of the return spring 42. The valve seat 43 extends up to the outlet 44 of the drain valve and the side wall of valve chamber comprising the valve body 41 is provided with the inlet. Therefore, when power source is supplied to the miniature motor 34 and the output shaft 24 rotates in the direction indicated by the arrow mark, the take-up pulley 35 rotates taking up the wire 38. Thus, the valve body 41 is pulled upward against the return spring 42, causing the valve seat 43 to open. When power source is supplied continuously to the motor 34, a force working in the direction indicated by the arrow mark is maintained at the pulley 35 and the valve body 41 is kept in the opening condition. When power supply to the miniature motor stops, a rotating force of motor disappears and simultaneously the gear 20 of said motor rotating shaft 4 is decoupled from the gear 22 of the reduction mechanism. Resultingly, a rotating force is not transmitted to the output shaft 24 and the valve body 41 is pressed to the valve seat 43 due to a spring pressure of the return spring 42 resulting in the closing condition.

Application of the miniature motor of the present invention into such a drain valve alleviates a load of return spring 42 and quickly and reliably causes the valve body 41 to result in the closing condition because the rotor side, namely the rotating shaft 4 and hysteresis ring 18 are decoupled from the reduction mechanism 21 immediately when power source supply to the motor stops. The limit switch 46 is provided for controlling the main motor of washing machine in the following processes that the pin 47 of the pulley 35 comes to contact with the lever 48 of the limit switch 46 in such a timing that the miniature motor 34 rotates, said pulley 35 rotates and the valve body 41 opens. When the miniature motor 34 stops, the pin 47 isolates from the lever 48 and the pulley 35 returns to the initial position. Thus, the valve body closes.

We claim:

1. A combined small-size motor and speed reduction mechanism which comprises:
    a motor having a cylindrical magnetic core with an axial hole therethrough and an excitation coil disposed therearound,
    a yoke disposed adjacent a first end of said core having pole pieces extending axially along said core in spaced relation to the circumference of said coil,
    a rotatable shaft mounted for rotation within said core and for axial movement with respect to said motor,
    a main pole and an interpole mounted on said core adjacent to second end thereof,
    an annular spring support means mounted on said rotatable shaft adjacent second end of said core, said spring support means having an axial annular recess,
    an absorbing member of magnetic material affixed to an end of said rotatable shaft and having an axial annular recess in opposed relationship to the recess of said spring support means,
    a coil spring extending between and having its ends disposed in the annular recesses of said spring support means and said absorbing member, said spring axially moving said rotatable shaft away from the first end of said core when said field is not excited,
    a non-magnetic disk means extending radially outward from said absorbing member and having a hysteresis ring depending axially therefrom, said disk means having a diameter larger than the diameter of said interpole and main pole,
    a gear means mounted on the second end of said rotatable shaft, and
    a speed reduction means activatable by the axial movement of said shaft,
    wherein when said coil is excited a magnetic closed loop circuit is formed through said core, said absorbing member, said main pole, said interpole, said hysteresis ring, said yoke, and said core causing axial movement of said rotating shaft to thereby activate said speed reduction means.

* * * * *